(12) United States Patent
Robertson, Jr. et al.

(10) Patent No.: US 10,669,936 B2
(45) Date of Patent: Jun. 2, 2020

(54) THERMALLY CONFORMING ACOUSTIC LINER CARTRIDGE FOR A GAS TURBINE ENGINE

(71) Applicant: United Technologies Corporation, Hartford, CT (US)

(72) Inventors: Thomas J. Robertson, Jr., Glastonbury, CT (US); Mark W. Costa, Storrs, CT (US); David A. Welch, Quaker Hill, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 386 days.

(21) Appl. No.: 14/774,035

(22) PCT Filed: Mar. 12, 2014

(86) PCT No.: PCT/US2014/024618
§ 371 (c)(1),
(2) Date: Sep. 9, 2015

(87) PCT Pub. No.: WO2014/197053
PCT Pub. Date: Dec. 11, 2014

(65) Prior Publication Data
US 2016/0032833 A1 Feb. 4, 2016

Related U.S. Application Data

(60) Provisional application No. 61/779,327, filed on Mar. 13, 2013.

(51) Int. Cl.
*F02C 7/04* (2006.01)
*B64D 33/02* (2006.01)
(Continued)

(52) U.S. Cl.
CPC ............. *F02C 7/045* (2013.01); *B64D 33/02* (2013.01); *F01D 11/125* (2013.01);
(Continued)

(58) Field of Classification Search
CPC .. F02C 7/045; F01D 11/125; F05D 2300/433; F05D 2300/44;
(Continued)

(56) References Cited

U.S. PATENT DOCUMENTS

| 2,994,472 A | 8/1961 | Botje |
| 3,104,091 A | 9/1963 | Vivian |

(Continued)

FOREIGN PATENT DOCUMENTS

| EP | 2305984 A2 * | 4/2011 | ............ F01D 11/127 |
| JP | 2001241397 | 9/2001 | |

(Continued)

OTHER PUBLICATIONS

EP search report for EP14807640.9 dated Apr. 4, 2017.
(Continued)

*Primary Examiner* — Devon C Kramer
*Assistant Examiner* — Kelsey L Stanek
(74) *Attorney, Agent, or Firm* — Getz Balich LLC (57) ABSTRACT

A cartridge for a fan case of a gas turbine engine includes an inlet acoustic liner section integrated with a thermally conforming liner section.

14 Claims, 6 Drawing Sheets

(51) Int. Cl.
*F02C 7/045* (2006.01)
*F01D 11/12* (2006.01)

(52) U.S. Cl.
CPC .... *F01D 11/127* (2013.01); *B64D 2033/0206* (2013.01); *B64D 2033/0286* (2013.01); *F05D 2250/283* (2013.01); *F05D 2300/173* (2013.01); *F05D 2300/433* (2013.01); *F05D 2300/44* (2013.01); *F05D 2300/5021* (2013.01); *Y02T 50/671* (2013.01)

(58) Field of Classification Search
CPC ....... F05D 2300/5021; F05D 2250/283; B64D 33/02; B64D 2033/0206; B64D 2033/0286; Y02T 50/671
USPC ......... 415/119, 9, 197, 1, 134, 173.1, 182.1, 415/220; 29/889.22; 156/285, 60, 538
See application file for complete search history.

(56) References Cited

U.S. PATENT DOCUMENTS

| | | | |
|---|---|---|---|
| 4,251,185 A | 2/1981 | Karstensen | |
| 4,307,993 A | 12/1981 | Hartel | |
| 4,662,658 A | 5/1987 | Holowach et al. | |
| 4,785,623 A | 11/1988 | Reynolds | |
| 4,786,232 A | 11/1988 | Davis et al. | |
| 5,080,557 A | 1/1992 | Berger | |
| 5,160,248 A | 11/1992 | Clarke | |
| 5,201,887 A | 4/1993 | Bruchez, Jr. et al. | |
| 5,233,822 A | 8/1993 | Ward et al. | |
| 5,291,732 A | 3/1994 | Halila | |
| 5,318,402 A | 6/1994 | Bailey et al. | |
| 5,320,486 A | 6/1994 | Walker et al. | |
| 6,227,794 B1 | 5/2001 | Wojtyczka et al. | |
| 6,364,603 B1 | 4/2002 | Czachor et al. | |
| 6,382,905 B1 | 7/2002 | Czachor et al. | |
| 6,637,186 B1 | 10/2003 | Van Duyn | |
| 6,910,853 B2 | 6/2005 | Corman et al. | |
| 6,935,836 B2 | 8/2005 | Ress, Jr. et al. | |
| 7,241,108 B2 | 7/2007 | Lewis | |
| 7,390,161 B2 | 6/2008 | Xie et al. | |
| 7,402,022 B2 * | 7/2008 | Harper | F01D 21/045 415/214.1 |
| 7,588,212 B2 | 9/2009 | Rohr Inc | |
| 7,694,505 B2 | 4/2010 | Schilling | |
| 7,797,809 B2 | 9/2010 | Costa et al. | |
| 7,866,939 B2 | 1/2011 | Harper et al. | |
| 7,914,251 B2 | 3/2011 | Pool et al. | |
| 8,016,543 B2 | 9/2011 | Braley et al. | |
| 2008/0016844 A1 * | 1/2008 | Shutrump | B64D 29/02 60/226.1 |
| 2008/0115339 A1 | 5/2008 | Blanton et al. | |
| 2009/0056343 A1 | 3/2009 | Suciu et al. | |
| 2009/0155065 A1 | 6/2009 | Xie et al. | |
| 2010/0111675 A1 | 5/2010 | Wojtyczka et al. | |
| 2010/0284790 A1 * | 11/2010 | Pool | F01D 5/16 415/119 |
| 2011/0037233 A1 | 2/2011 | Harper | |
| 2011/0044806 A1 | 2/2011 | Harper | |
| 2011/0044807 A1 | 2/2011 | Bottome | |
| 2011/0052383 A1 | 3/2011 | Lussier | |
| 2011/0068222 A1 * | 3/2011 | Vauchel | B64D 29/08 244/1 N |
| 2011/0123326 A1 | 5/2011 | DeBenedetto et al. | |
| 2011/0142615 A1 | 6/2011 | Georges et al. | |
| 2011/0232833 A1 | 9/2011 | Collins et al. | |
| 2012/0280082 A1 | 11/2012 | Calder et al. | |
| 2013/0195605 A1 * | 8/2013 | Robertson | F01D 11/125 415/1 |
| 2014/0286748 A1 | 9/2014 | Costa et al. | |

FOREIGN PATENT DOCUMENTS

| | | |
|---|---|---|
| JP | 2009515075 | 4/2009 |
| JP | 2010031871 | 2/2010 |

OTHER PUBLICATIONS

EP search report for EP14807640.9 dated Feb. 9, 2016.
The GE90 Engine, geaviation.com.
GE90-94B Engine Logs More than 10 Million Flight Hours, deagel.com, article from Apr. 1, 2008.
Gunston, Bill, Editor, "Pratt & Whitney PW8000" Jane's Aero-Engines, Mar. 2000, pp. 510-512, Issue Seven, Janes Information Group Limited, Coulsdon, United Kingdom.

* cited by examiner

THERMALLY CONFORMING ACOUSTIC LINER CARTRIDGE FOR A GAS TURBINE ENGINE

This application claims priority to PCT Patent Appln. No. PCT/US2014/024618 filed Mar. 12, 2014, which claims priority to U.S. Patent Appln. No. 61/779,327 filed Mar. 13, 2013.

BACKGROUND

The present disclosure relates to gas turbine engines, and in particular, to a fan case for a gas turbine engine.

The fan section of a gas turbine engine includes an array of fan blades which project radially from a hub within a fan case. Although exceedingly unlikely, it is possible for a fan blade or a fragment thereof to separate from the hub and strike the fan case. The fan case operates to prevent any liberated material from radially exiting the engine. The demands of blade containment are balanced by the demands for low weight and high strength.

For relatively small diameter engines, adequate containment capability is typically achieved with a hardwall design in which a metallic case thick enough to resist penetration by a blade fragment is utilized. For relatively large diameter engines, a metallic fan case thick enough to resist penetration may be prohibitively heavy so a softwall design is typically utilized in which a light weight, high strength ballistic fabric is wrapped in a plurality of layers around a relatively thin, penetration susceptible metallic or composite case. In operation, a separated blade fragment penetrates the case and strikes the fabric. The case is punctured locally but retains structural integrity after impact. The punctured case continues to support the fabric and maintain clearance for the blade tips.

In turbofan engines, differences between the fan blade material and fan case material may contribute to thermally induced rub. Turbine engine fans and their cases experience differential thermal expansion across an operational range. For example, in flight, where other portions of the engine are subject to heating, the fan and fan case temperatures may decrease at altitude. An exemplary temperature decrease from ground to altitude may be in excess of 120 F (50 C). With an exemplary metallic fan blades and non metallic fan case, the decrease in temperature may cause the fan to decrease in diameter more than the fan case due to the coefficient of thermal expansion differential.

SUMMARY

A cartridge for a fan case of a gas turbine engine according to one disclosed non-limiting embodiment of the present disclosure includes an inlet acoustic liner section integrated with a thermally conforming liner section.

In a further embodiment of the present disclosure, the inlet acoustic liner section and the thermally conforming liner section are supported by an outboard ring.

In a further embodiment of any of the foregoing embodiments of the present disclosure, the outboard ring is manufactured of an aluminum alloy.

In a further embodiment of any of the foregoing embodiments of the present disclosure, the inlet acoustic liner section includes a honeycomb layer inboard of the outboard ring and an inboard perforated layer inboard of the honeycomb layer.

In a further embodiment of any of the foregoing embodiments of the present disclosure, the honeycomb layer provides a 3D aero profile.

In a further embodiment of any of the foregoing embodiments of the present disclosure, the thermally conforming liner section includes a honeycomb layer inboard of the outboard ring, a septum inboard of the honeycomb layer and a rub strip inboard of the septum.

A fan nacelle for a gas turbine engine according to another disclosed non-limiting embodiment of the present disclosure includes a containment case, an inlet attached to the containment case at an interface, and a cartridge which spans the interface.

In a further embodiment of any of the foregoing embodiments of the present disclosure, the interface includes a forward flange of the containment case and an inlet flange of the inlet.

In a further embodiment of any of the foregoing embodiments of the present disclosure the interface is a bolted interface.

In a further embodiment of any of the foregoing embodiments of the present disclosure, the inlet defines an inboard hook to at least partially capture the cartridge.

In a further embodiment of any of the foregoing embodiments of the present disclosure, the inboard hook is forward of an aft inlet bulkhead.

In a further embodiment of any of the foregoing embodiments of the present disclosure, a fan cowl is mounted to the aft inlet bulkhead.

In a further embodiment of any of the foregoing embodiments of the present disclosure, the cartridge provides a 3D aero profile.

In a further embodiment of any of the foregoing embodiments of the present disclosure, the cartridge provides a perforated face sheet and a fan rub strip.

In a further embodiment of any of the foregoing embodiments of the present disclosure, the cartridge provides an inlet acoustic liner section integrated with a thermally conforming liner section.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
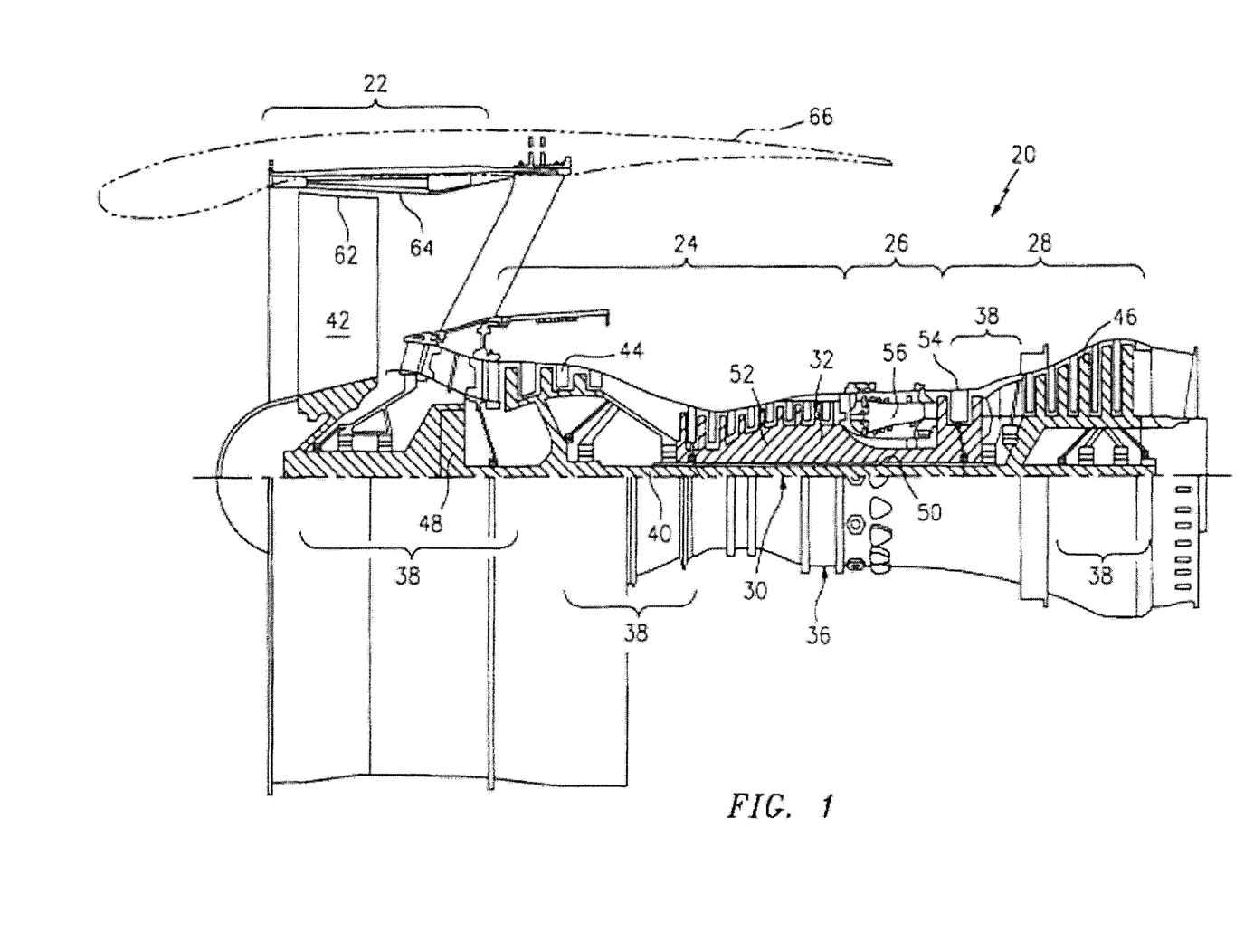
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine architectures might include an augmentor section and exhaust duct section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a low bypass augmented turbofan, turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing compartments 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the HPC 52 and the HPT 54. The inner shaft 40 and the outer shaft 50 are concentric and rotate about the engine central longitudinal axis "A" which is collinear with their longitudinal axes.

Core airflow is compressed by the LPC 44 then the HPC 52, mixed with fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by the bearing compartments 38. It should be understood that various bearing compartments 38 at various locations may alternatively or additionally be provided.

In one example, the gas turbine engine 20 is a high-bypass geared aircraft engine with a bypass ratio greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds which can increase the operational efficiency of the LPC 44 and LPT 46 to render increased pressure in a relatively few number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans, where the rotational speed of the fan 42 is the same (1:1) of the LPC 44.

In one example, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The relatively low Fan Pressure Ratio according to one example gas turbine engine 20 is less than 1.45. Low Corrected Fan Tip Speed is the actual fan tip speed divided by an industry standard temperature correction of ("Tram"/ 518.7)$^{0.5}$ in which ""Tram" represents about 0.0 degrees F. due to a flight velocity of about 0.8 Mach. The Low Corrected Fan Tip Speed according to one example gas turbine engine 20 is less than about 1150 fps (351 m/s).

The fan section 22 generally includes a fan containment case 60 within which the fan blades 42 are contained. Tips 62 of the fan blades 42 run in close proximity to an inboard surface 64 of the fan containment case 60. The fan containment case 60 is enclosed within an aerodynamic fan nacelle 66 (illustrated schematically). The nacelle 66 may include a Variable Area Fan Nozzle (VAFN) system (not shown) and/or a Thrust reverser system (not shown).

The fan blades 42 may be subject to radial expansion due to inertial forces associated with fan rotation (centrifugal loading) as well as thermal expansion influenced by the material properties of the fan blades, e.g., the coefficient of thermal expansion (CTE). The fan containment case 60 may also be subject to thermal expansion. In operation, a desired clearance between the fan blade tips 62 and the adjacent inboard surface 64 may be specifically maintained for engine efficiency.

Figure 2:
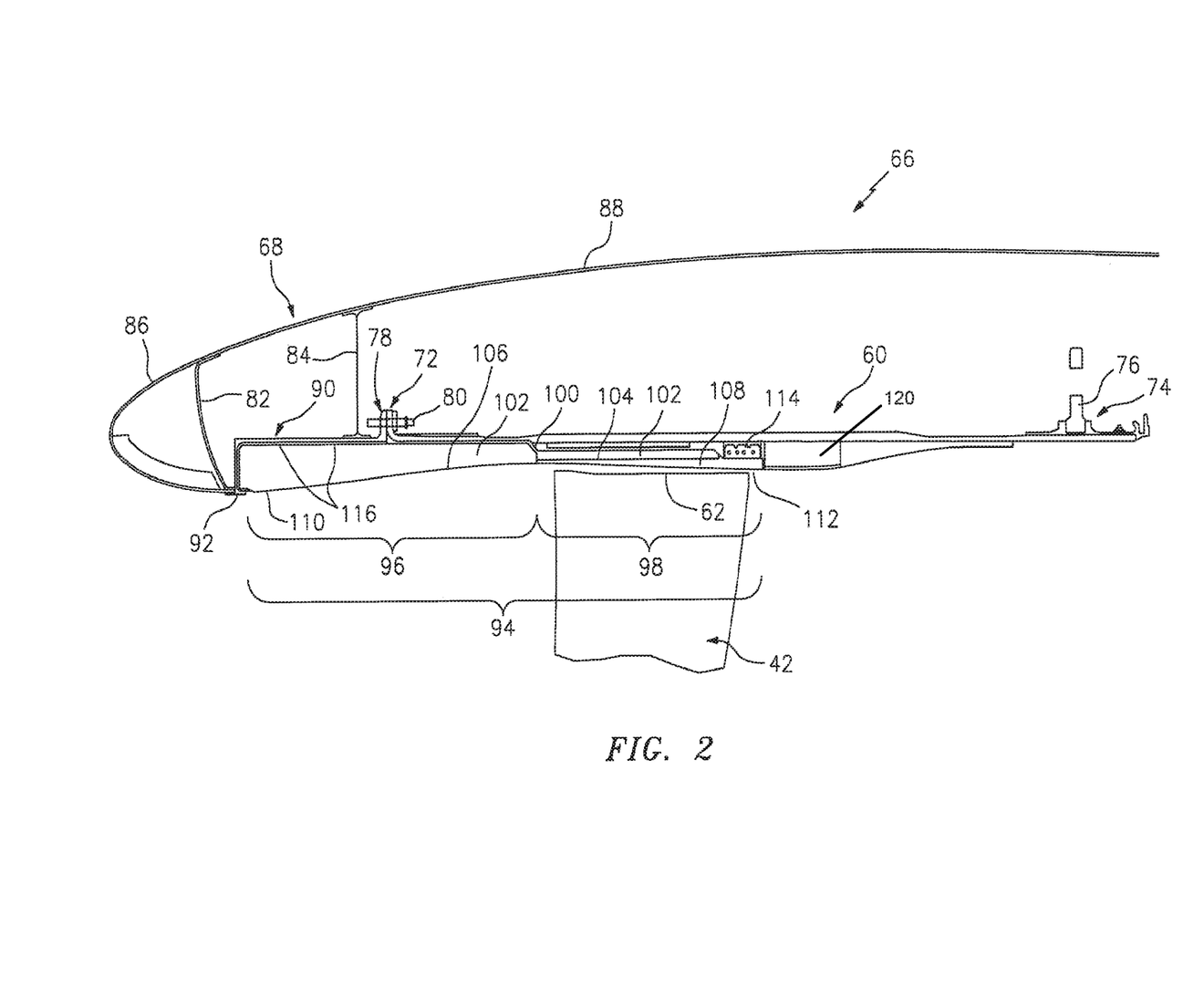
FIG. 2 is an expanded sectional view of a fan nacelle containment case and cartridge.
Figure 3:
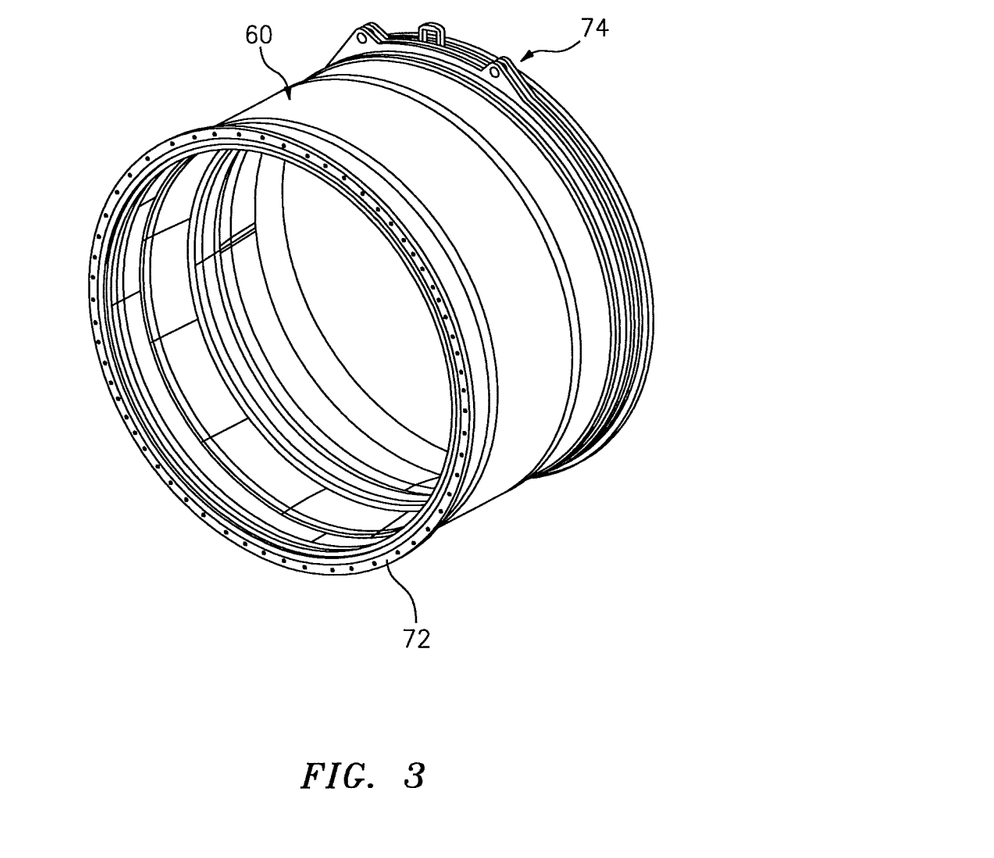
FIG. 3 is a perspective view of a fan nacelle containment case.

With reference to FIG. 2, the fan containment case 60 generally includes a forward flange 72 "A-flange" and a mount ring structure 74 that encircles a downstream end portion of the fan containment case 60 (also shown in FIG. 3). The mount ring structure 74 may be formed of metal such as titanium or aluminum and may include a clevis 76 to mount the engine 20 to an engine pylon (FIG. 1).

The flange 72 is attached to an inlet flange 78 of the inlet 68 with a multiple of fasteners 80 such as bolts. The inlet 68 includes a forward inlet bulkhead 82 and an aft inlet bulkhead 84 about which an aerodynamic inlet nose 86 is defined. A fan cowl 88 extends from the inlet nose 86 to aerodynamically enclose the containment case 60. A forward section 90 of the inlet flange 78 defines an inlet inboard hook 92 to at least partially capture a cartridge 94. The inlet inboard hook 92 is axially forward of the inlet flange 78.

Figure 5:
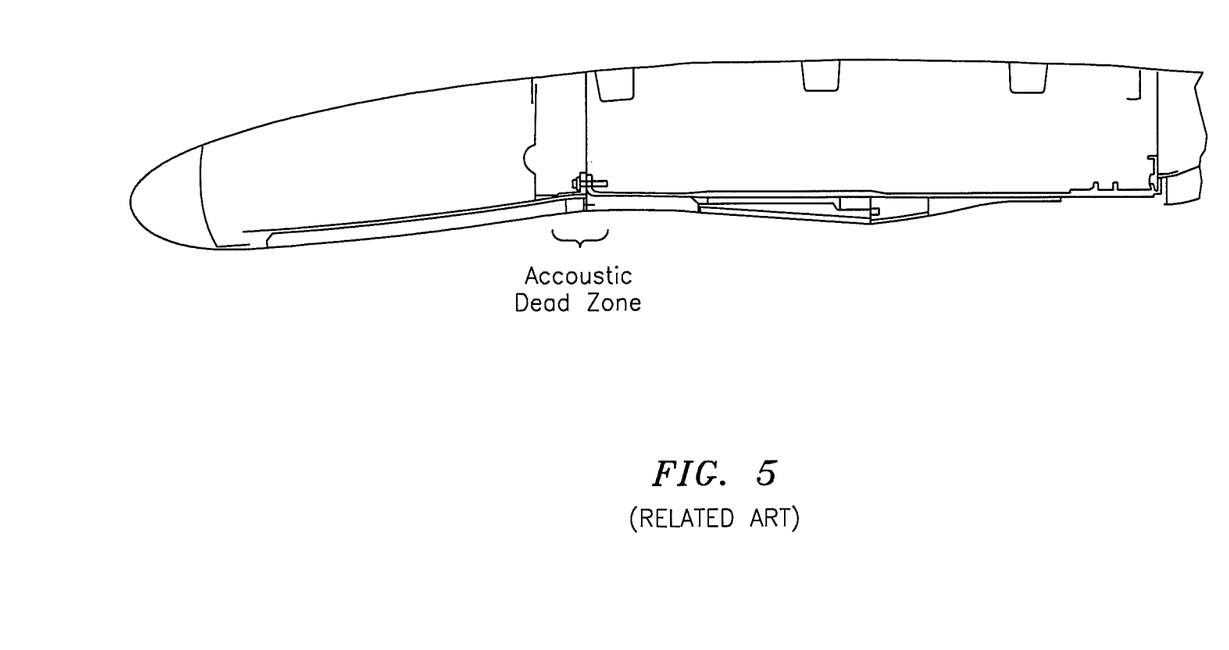
FIG. 5 is an expanded sectional view of a RELATED ART fan nacelle containment case.

The cartridge 94 provides an inlet acoustic liner (IAL) section 96 integrated with a thermally conforming liner (TCL) section 98. The cartridge 94 spans the interface between the inlet flange 78 and the forward flange 72 of the fan containment case 60 to eliminate any acoustic discontinuity from the interface and maximizes the effective acoustic treatment area. That is, the cartridge 94 eliminates the discontinuity typically located by the interface between the inlet acoustics and fan acoustics that results in an acoustic dead zone (FIG. 5; RELATED ART). The cartridge 94 may be circumferentially segmented or a continuous cylinder.

Figure 4:
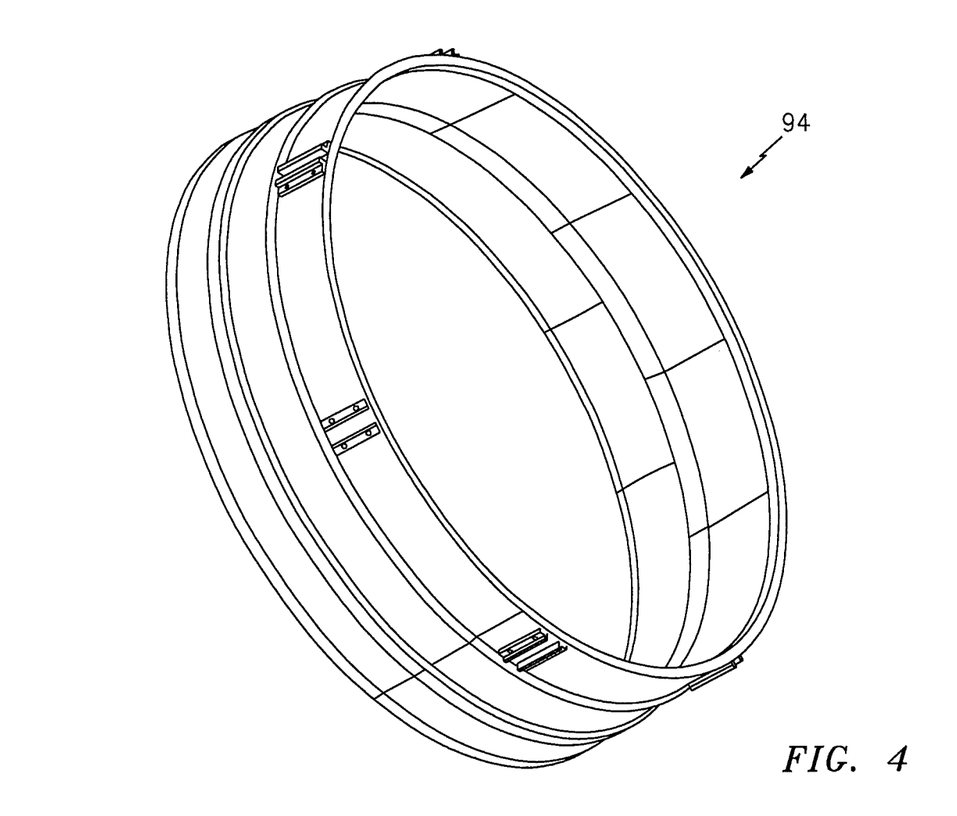
FIG. 4 is a perspective view of a cartridge receivable within the fan nacelle containment case.

The cartridge 94 (also shown in FIG. 4) generally includes an outboard ring 100, a honeycomb layer 102, a septum 104, and an inboard perforated layer 106 in the IAL section 96 and a rub strip 108 in the TCL section 98. The outboard ring 100, the honeycomb layer 102 and the septum 104 may be manufactured of aluminum alloy and the rub strip 108 may be manufactured of a filled epoxy with aramid honeycomb. The septum 104 forms an inboard liner of the rub strip 108. It should be understood that alternative or additional layers may be provided.

The honeycomb layer 102 within the IAL section 96 may include a 3D aero profile. That is, the honeycomb layer 102 may be thicker forward than aft to provide a desired transition profile downstream of the aerodynamic inlet nose 86.

A forward end section 110 of the cartridge 94 is received within the inlet inboard hook 92 and an aft end section 112 of the cartridge 94 is attached to the fan containment case 60 with a radially compliant attachment 114 (illustrated schematically). The forward end section 110 of the cartridge 94 is readily slid into and supported by the inlet inboard hook 92.

The forward end section 110 of the cartridge 94 may be positioned relative to the inlet inboard hook 92 via radial dampers 116 such as silicone rubber full annulus or segmented seals. The radial dampers 116 axial position and circumferential extent may be tailored, if required, to break up the natural frequency modes that may be found in the cartridge 94 based on the frequency response requirements.

Figure 6:
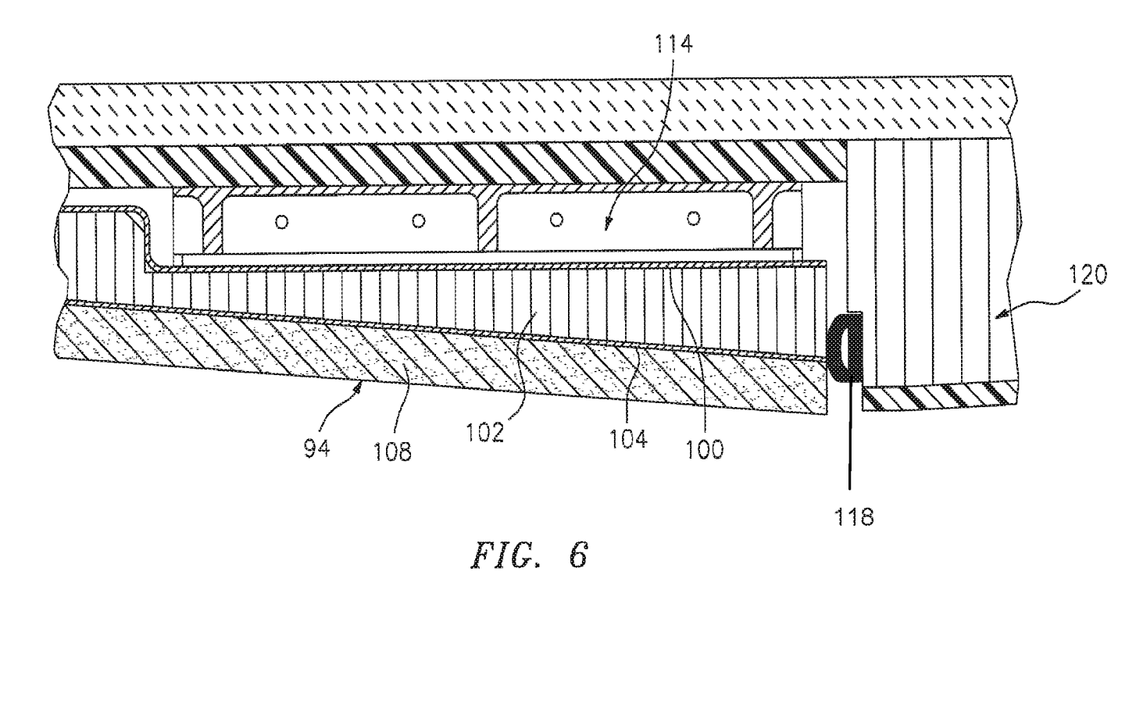
FIG. 6 is an expanded sectional view of an aft portion of the fan nacelle containment case and cartridge.

The radially compliant attachment 114 axially and circumferentially retains the aft end section 112 of the cartridge 94. A recirculation seal 118 may be positioned axially between the cartridge 94 and an impact liner 120 to maintain aero smoothness and damp movement of the cartridge 94 in the axial direction and optionally in the radial direction (FIG. 6). Radial movement provided by the radially compliant attachment 114 facilitates thermal conformation with the fan blade tips 62. It should be appreciated that various attachments may alternatively or additionally provided.

The cartridge 94 beneficially maximizes the acoustic treatment even in an axially shortened fan nacelle with the performance benefit of a thermally conforming liner. The cartridge 94 is also weight efficient as the sections are integrated. Furthermore, the cartridge 94 is readily removable on-wing.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A fan case of a gas turbine engine comprising:
   a cartridge comprising an inlet acoustic liner section integrated with an axially adjacent thermally conforming liner section;
   an impact liner axially aft of said cartridge; and
   a seal positioned axially between said cartridge and said impact liner to damp movement of said cartridge,
   wherein said cartridge is configured to be at least partially captured within an inboard hook of an inlet such that said cartridge is radially constrained at a forward end of said cartridge,
   wherein said inlet acoustic liner section and said thermally conforming liner section are supported by an outboard ring,
   wherein said inlet acoustic liner section includes a first portion of a honeycomb layer radially inboard of said outboard ring and an inboard perforated layer radially inboard of said honeycomb layer,
   wherein said thermally conforming liner section includes a second portion of said honeycomb layer radially inboard of said outboard ring, a septum radially inboard of said second portion of said honeycomb layer and a rub strip radially inboard of said septum,
   wherein said inboard hook is forward of an aft inlet bulkhead, and
   wherein said first portion of said honeycomb layer has a forward end and an aft end and wherein said first portion of said honeycomb layer has a radial thickness that is greater at said forward end than at said aft end.

2. The fan case as recited in claim 1, wherein said outboard ring is manufactured of an aluminum alloy.

3. The fan case as recited in claim 1, wherein said honeycomb layer provides a 3D aero profile.

4. A fan nacelle for a gas turbine engine comprising:
   a containment case;
   an inlet attached to said containment case at an interface; and
   a cartridge which spans said interface,
   an impact liner; and
   a seal positioned axially between said cartridge and said impact liner to damp movement of said cartridge in an axial direction;
   wherein said inlet defines an inboard hook to at least partially capture said cartridge such that said cartridge is radially constrained at a forward end of said cartridge,
   wherein an aft end of said cartridge is attached to said containment case with a radially compliant attachment, wherein said forward end of said cartridge is positioned relative to said inboard hook via radial dampers, and wherein an inboard surface of said cartridge has a first radial position at said forward end and a second radial position at said aft end and wherein said first radial position is radially inboard of said second radial position.

5. The fan nacelle as recited in claim 4, wherein said interface includes a forward flange of said containment case and an inlet flange of said inlet.

6. The fan nacelle as recited in claim 4, wherein said interface is a bolted interface.

7. The fan nacelle as recited in claim 4, wherein said inboard hook is forward of an aft inlet bulkhead.

8. The fan nacelle as recited in claim 7, wherein a fan cowl is mounted to said aft inlet bulkhead.

9. The fan nacelle as recited in claim 4, wherein said cartridge provides a 3D aero profile.

10. The fan nacelle as recited in claim 4, wherein said cartridge provides a perforated face sheet and a fan rub strip.

11. The fan nacelle as recited in claim 4, wherein said cartridge provides an inlet acoustic liner section integrated with a thermally conforming liner section.

12. The fan nacelle as recited in claim 4, wherein said radially compliant attachment axially and circumferentially retains said aft end of said cartridge.

13. The fan nacelle as recited in claim 4, wherein said radial dampers include a silicone rubber full annulus or segmented seals.

14. A fan nacelle for a gas turbine engine comprising:
a containment case;
an inlet attached to said containment case at an interface; and
a cartridge which spans said interface,
an impact liner; and
a seal positioned axially between said cartridge and said impact liner to damp movement of said cartridge;
wherein said inlet defines an inboard hook to at least partially capture said cartridge such that said cartridge is radially constrained at a forward end of said cartridge,
wherein an aft end of said cartridge is attached to said containment case with a radially compliant attachment,
wherein said cartridge provides a 3D aero profile, and
wherein an inboard surface of said cartridge has a first radial position at said forward end and a second radial position at said aft end and wherein said first radial position is radially inboard of said second radial position.

* * * * *